United States Patent
Krenz et al.

(10) Patent No.: US 12,151,820 B2
(45) Date of Patent: Nov. 26, 2024

(54) SOFTWARE CONTROLLED AIR FLOW MANAGEMENT

(71) Applicant: B/E Aerospace, Inc., Winston Salem, NC (US)

(72) Inventors: Michael Krenz, Roscoe, IL (US); Christopher M. Comiskey, Winston-Salem, NC (US)

(73) Assignee: B/E AEROSPACE, INC., Winston Salem, NC (US)

( * ) Notice: Subject to any disclaimer, the term of this patent is extended or adjusted under 35 U.S.C. 154(b) by 557 days.

(21) Appl. No.: 17/351,078

(22) Filed: Jun. 17, 2021

(65) Prior Publication Data

US 2021/0394912 A1    Dec. 23, 2021

Related U.S. Application Data

(60) Provisional application No. 63/040,847, filed on Jun. 18, 2020.

(51) Int. Cl.
*B64D 13/06* (2006.01)
*H04N 5/33* (2023.01)

(52) U.S. Cl.
CPC .............. *B64D 13/06* (2013.01); *H04N 5/33* (2013.01); *B64D 2013/0655* (2013.01)

(58) Field of Classification Search
CPC . B64D 13/00; B64D 13/06; B64D 2013/0655
USPC .......................................................... 454/76
See application file for complete search history.

(56) References Cited

U.S. PATENT DOCUMENTS

| | | | | |
|---|---|---|---|---|
| 5,695,396 | A * | 12/1997 | Markwart | B64D 13/00 454/71 |
| 7,878,586 | B2 * | 2/2011 | Kneller | B64D 11/00 244/129.1 |
| 8,576,064 | B1 * | 11/2013 | Mitchell | B64D 11/00155 340/539.11 |
| 2003/0096572 | A1 | 5/2003 | Gutta et al. | |
| 2012/0315835 | A1 | 12/2012 | Maranville et al. | |
| 2016/0325839 | A1 | 11/2016 | Wang | |
| 2018/0065752 | A1 * | 3/2018 | Franco | B64D 13/06 |
| 2018/0079278 | A1 | 3/2018 | Kirpichnikov et al. | |

(Continued)

FOREIGN PATENT DOCUMENTS

| | | |
|---|---|---|
| CN | 105292493 A | 2/2016 |
| CN | 111219835 A * | 6/2020 |

(Continued)

OTHER PUBLICATIONS

Extended European Search Report for European Patent Application No. EP21180408.3, dated Nov. 8, 2021.

(Continued)

*Primary Examiner* — Allen R. B. Schult
(74) *Attorney, Agent, or Firm* — SNELL & WILMER L.L.P.

(57) ABSTRACT

A system comprises an environmental control system (ECS) having a plurality of ducts configured to convey a flow of air into an interior space through the plurality of ducts. A plurality of valves are disposed in the plurality of ducts to control the flow of air through a respective duct into the interior space. A plurality of sensors are disposed in the interior space configured to sense a passenger condition.

12 Claims, 4 Drawing Sheets

(56) References Cited

U.S. PATENT DOCUMENTS

2019/0061957 A1 2/2019 Nicks
2019/0184788 A1 6/2019 Stachewicz et al.

FOREIGN PATENT DOCUMENTS

DE 102015115066 A1 3/2016
KR 20140124449 A 10/2014

OTHER PUBLICATIONS

European Patent Office, European Office Action dated Apr. 17, 2023 in Application No. 21180408.3.
European Patent Office, European Office Action dated Jun. 26, 2024 in Application No. 21180408.

\* cited by examiner

SOFTWARE CONTROLLED AIR FLOW MANAGEMENT

CROSS-REFERENCE TO RELATED APPLICATIONS

This application claims priority to and the benefit of U.S. Provisional Patent Application No. 63/040,847 filed Jun. 18, 2020, the entire content of which is incorporated herein by reference.

BACKGROUND

1. Field

The present disclosure relates to airflow management, and more particularly to airflow management in aircraft cabins.

2. Description of Related Art

Controlling airflow has been shown to aid in the control of contamination spread by air. This contamination could be particulate, droplet, gaseous or other forms of airborne matter. To more precisely control the airflow onboard aircraft, it may be desirable to be able to control the airflow through each vent in an airflow system into an enclosed space.

The conventional techniques have been considered satisfactory for their intended purpose. However, there is an ever present need for improved systems and methods for mitigated spread of airborne pathogens in enclosed environments. This disclosure provides a solution for this need.

SUMMARY

A system comprises an environmental control system (ECS) having a plurality of ducts configured to convey a flow of air into an interior space through the plurality of ducts. A plurality of valves are disposed in the plurality of ducts to control the flow of air through a respective duct into the interior space. A plurality of sensors are disposed in the interior space configured to sense a passenger condition.

A controller is operatively connected to receive signals from the plurality of sensors. The controller includes machine readable instructions configured to cause the controller to adjust the flow of air through the plurality of ducts with a respective valve or subset of the valves based on the sensed passenger condition. In certain embodiments, the controller can include an adaptive logic parameter definition item (PDI) file.

In certain embodiments, an imaging device can be disposed in the interior space configured to capture a reference image and a test image, and the sensed passenger condition includes determining a difference in passenger occupancy between the reference image and the test image. In certain embodiments, the imaging device can be a thermal imaging device, and the sensed passenger condition can be a passenger body temperature above a threshold.

Adjusting the flow of air through the plurality of ducts can include changing an airflow circulation pattern based on the sensed passenger condition. The sensed passenger condition can include at least one of weight distribution of passengers within the interior space, physical distribution of passengers within the interior space, a passenger body temperature above a threshold, a change in relative humidity in a passenger unit above a threshold, and/or a sound of coughing or sneezing.

In embodiments, the valve can be disposed in the duct in series with a passenger gasper valve. In embodiments, the valve can be disposed in the duct proximate a cabin pressurization port. In embodiments, the plurality of sensors can include a sensor incorporated into an in-flight entertainment (IFE) system.

In embodiments, the interior space can include a main space and a quarantine zone. In certain such embodiments, adjusting the flow of air through the plurality of ducts can include increasing flow into the main space and decreasing flow into the quarantine zone, wherein the flow of air from the quarantine zone is exhausted from the interior space.

Each duct of the plurality of ducts can further include an inlet and an outflow. In embodiments, the outflow can be positioned on a floor of the interior space. In certain embodiments, the exhausted air is exhausted to atmosphere through an outflow valve. In certain embodiments, the exhausted air is passed through an air filter before being recirculated.

In accordance with another aspect of this disclosure, a method comprises sensing a passenger condition in an interior space and adjusting airflow into the interior space based on the sensed passenger health condition and/or occupancy. Adjusting airflow can include changing an airflow circulation pattern based on the sensed passenger health condition and/or occupancy. In embodiments, adjusting airflow includes opening a valve in a respective duct to increase flow to a passenger unit based on the sensed passenger health condition and/or occupancy.

In embodiments, adjusting airflow can include, decreasing airflow to a respective passenger unit holding a sick passenger, and increasing airflow to a respective passenger unit surrounding the respective passenger unit holding the sick passenger.

In embodiments, the method can further include at least one of imaging the interior space at a first time, imaging the space at a second time, and comparing the images to determine an occupancy; and/or sensing a weight distribution of passengers within the interior space to determine an occupancy.

The interior space can include a main space and a quarantine zone, where adjusting airflow includes increasing flow into the main space and decreasing flow into the quarantine zone, and exhausting air from the quarantine zone from the interior space. Exhausting can include at least one of exhausting air to atmosphere through an outflow valve, and/or exhausting air to a recirculation module and filtering the air through an air filter before recirculation.

A system can include means for conveying a flow of air into an interior space through a plurality of ducts, a plurality of valves disposed in the plurality of ducts to control the flow of air through a respective duct into the interior space, means for sensing a passenger condition, means for adjusting the flow of air through the plurality of ducts with a respective valve or subset of the valves based on the sensed passenger condition.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
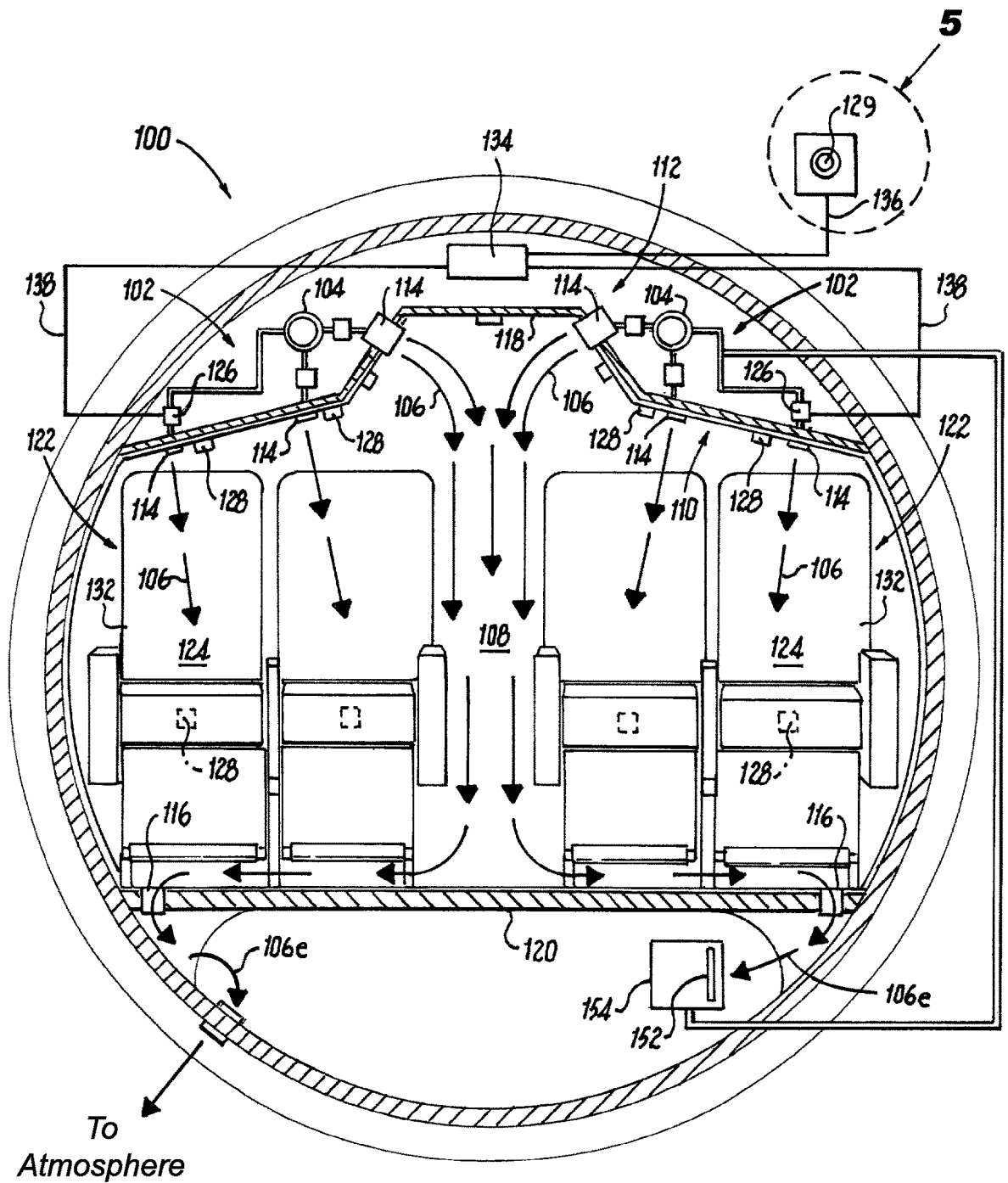
FIG. 1 is a schematic cross-sectional front end elevation view of an embodiment of a system constructed in accordance with the present disclosure, showing air flow patterns in a cabin.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to reduce the spread of contagions aboard aircraft, e.g., using air flows from the environmental control system (ECS).

Aircraft cabins strive to provide equalized pressure amongst all passengers, encouraging vertical air flow from top to bottom in the cabin. To do so, the majority of airflow into the cabin comes from a crown (e.g. on or near the ceiling) and is dispersed throughout the cabin, before being exhausted through an outflow in the floor of the cabin to the cargo bay. The low pressure cabin to cargo outflows create a suction effect to pull the air released from the crown downward, and into the outflow, where the air can then be passed through cabin outflow ducts to a cargo hold. Once in the cargo hold, the air can be exhausted completely (e.g. dumped overboard to the atmosphere via the aircraft outflow valve(s)) or can be recirculated to the cabin after filtration. In certain instances, there may be a need to control the flow of air throughout the cabin (e.g. pandemics, flu season, or the like). For example, it has been shown that airflow patterns in an enclosed space can affect the spread of aerosol pathogens. Therefore, strategically changing airflow patterns within the aircraft cabin can be used to reduce airborne spread of pathogens during flight.

Various control algorithms can be implemented using adaptive logic in software to vary the airflow circulation patterns in the aircraft based upon certain sensed conditions, for example based on occupancy and/or sensed health conditions such as increased temperature in passengers or change in breathing rate. System 100 provides a means for controlling the flow of air given the sensed conditions.

The system 100 includes an environmental control system (ECS) 102 having a plurality of ducts 104 configured to convey a flow of air 106 into an interior space (e.g. cabin) 108. The ducts 104 can direct air 106 to the interior space 108 either through a gasper circuit 110 or through the crown 112. Each duct 104 includes an inlet 114 into the interior space 108 and an outflow 116 from the interior space 108, where the inlet 114 is on or near a ceiling 118 of the interior space 108 (e.g. in the crown 112 or in the gasper circuit 110) and the outflow 116 is positioned on a floor 120 of the interior space 108. Multiple inlets 114 and outflows 116 can be included, for example there may be an inlet 114 and outflow 116 local to each row 122 within the interior space 108. A row 122 can be comprised of any number of passenger units 124.

A plurality of software controlled valves 126 are disposed in the ducts 104 to control the flow of air 106 through a respective duct into the interior space 108. For example, some valves can be disposed in the duct 104 in series with a passenger gasper valve (e.g. inlet 114 of gasper circuit), and some valves can be disposed in the duct 104 proximate a cabin pressurization port (e.g. inlet 114 of crown). It is also contemplated that the passenger gasper valve may also be software controlled, in addition to being controlled manually by a passenger. The cabin to cargo outflow ducts 116 may also contain software controlled valves to control airflow.

A plurality of sensors 128 are disposed in the interior space 108 configured to sense a passenger health condition and/or occupancy. The sensors can include any suitable sensor for determining a passenger health condition or an occupancy of the interior space 108 and can be positioned in central locations within the interior space 108 or may be local to each passenger unit 124. In determining a passenger health condition, a sensor 128 can be incorporated into an in-flight entertainment (IFE) system 130 (e.g. to determine a temperature of a passenger). A sensor 128 can include a humidity sensor placed a passenger unit 124 to sense changes in relative humidity above a threshold (e.g. to determine if a passenger has sneezed or is experiencing significant change in exhalation such as coughing causing a relative humidity above about 15%). A sensor 128 can include an auditory sensor configured to sense sounds such as coughing and/or sneezing. The sensor 128 can include an imaging device (e.g. a thermal imaging device) configured to sense passenger body temperature above a threshold (e.g. 100.4° F.). In certain embodiments, the sensor can include a user input feature 129, where if flight crew become aware of a sick passenger P, but surrounding sensors 128 did not detect the condition, the flight crew can input a location of the sick passenger P and their known condition.

In determining an occupancy of the interior space 108, or changes in occupancy, the sensors 128 can include an imaging device configured to capture a reference image and a test image. A difference in passenger occupancy between the reference image and the test image can determine any changes in occupancy or weight distribution within the interior space 108. In certain embodiments, an occupancy sensor 128 can include a weight sensor in each seat 132 configured to determine an aggregate weight of passengers within the interior space 108, as well as to determine the physical distribution of the passengers within the interior space 108. The physical location of passengers as well as their relative weights can impact how the airflow is modulated when a passenger health condition has been detected. It is contemplated that any or all sensors 128 described herein can be used in the interior space 108, any combination of sensors 128 may be used, or any one sensor 128 may be included individually within the interior space as needed or desired.

Figure 2:
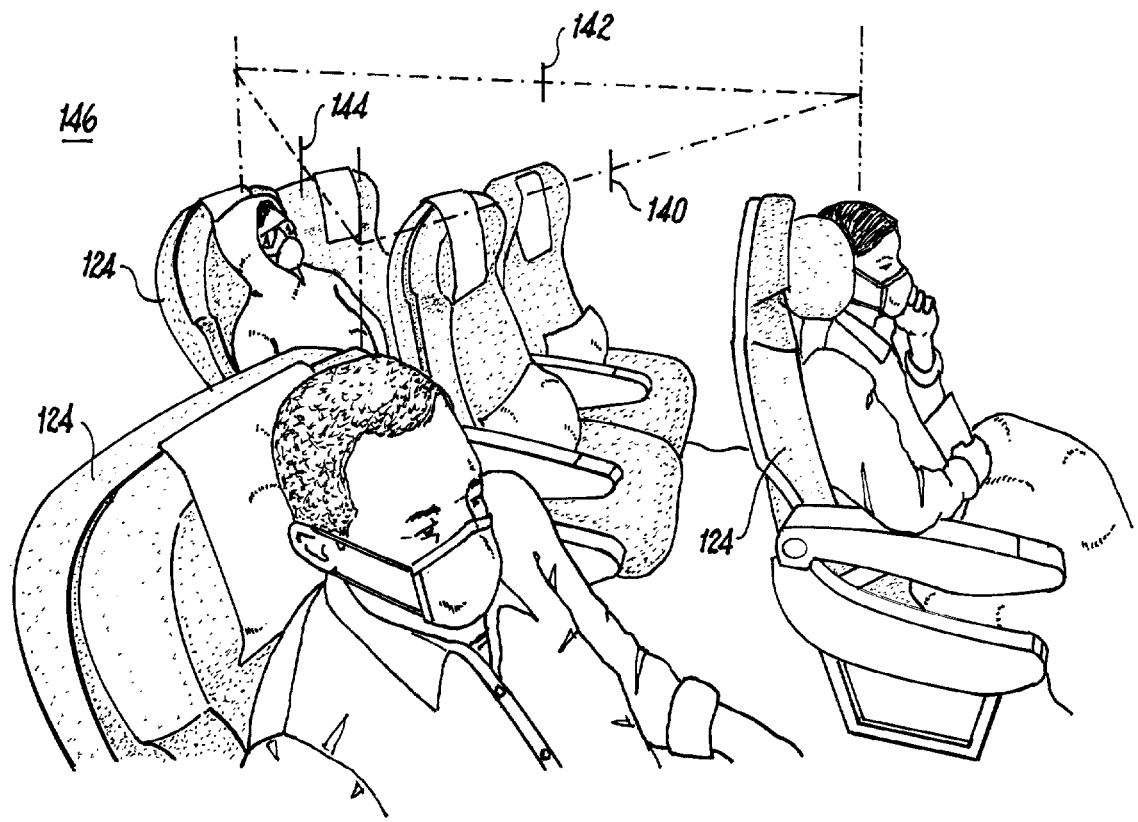
FIG. 2 is a schematic perspective view of a plurality of passengers in the cabin of FIG. 1, showing a pressure equalization scheme.
Figure 3:
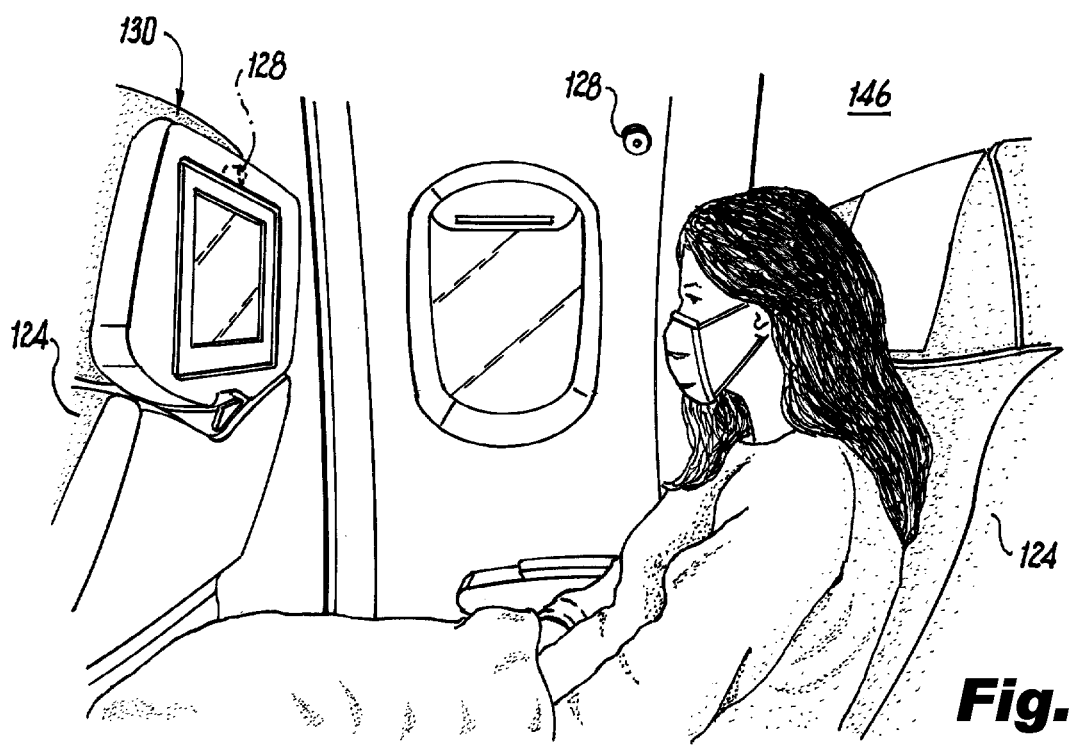
FIG. 3 is a schematic perspective view of a passenger in the cabin of FIG. 1; showing the system of FIG. 1 in an in-flight entertainment system.
Figure 4:
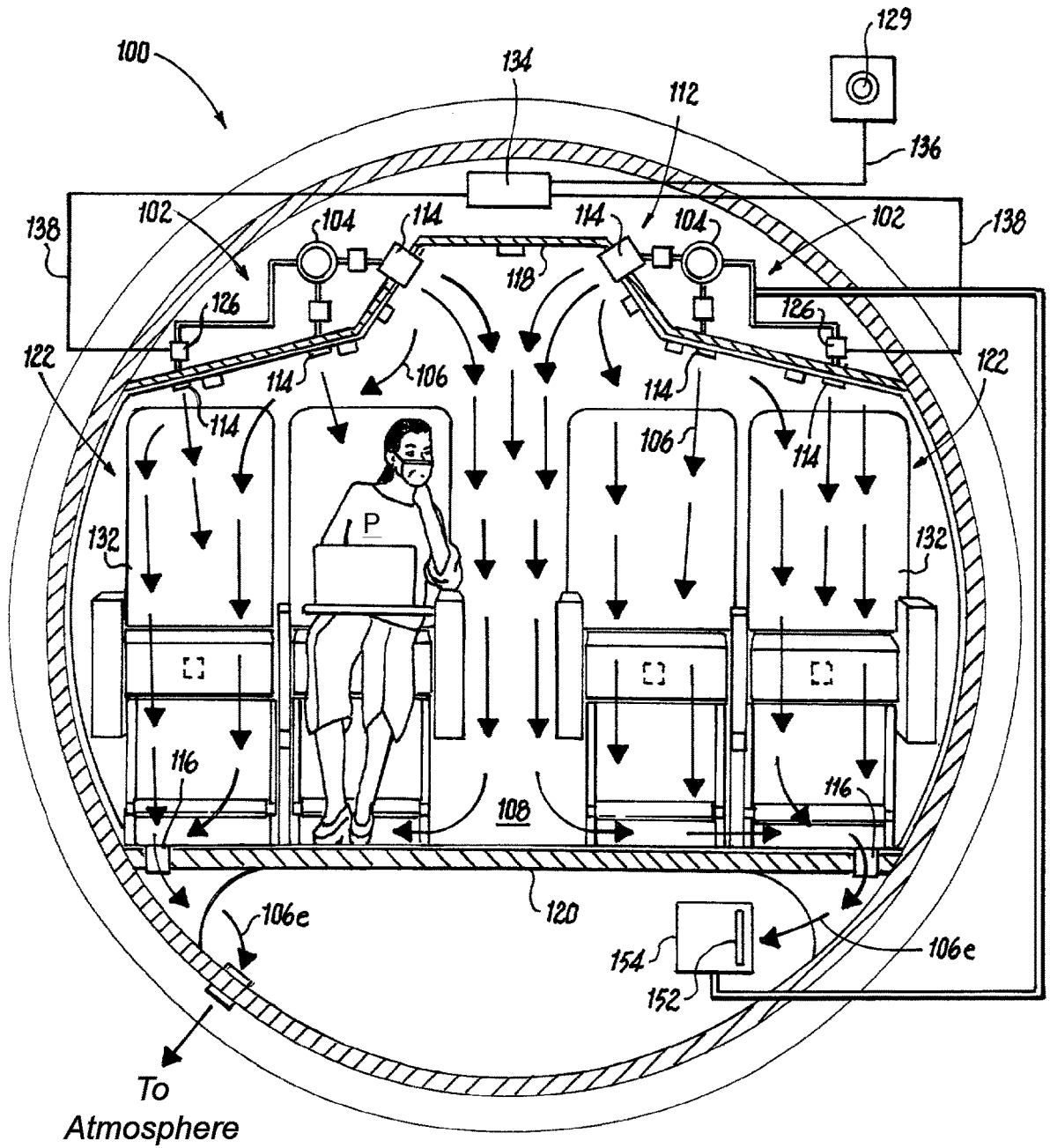
FIG. 4 is a schematic cross-sectional front end elevation view of an embodiment of a system constructed in accordance with the present disclosure, showing modified air flow patterns in the cabin of FIG. 1.
Figure 5:
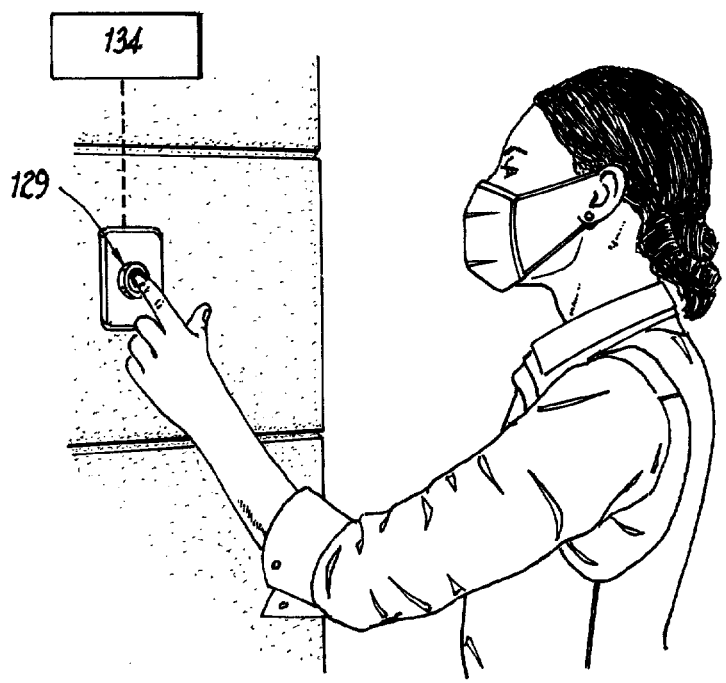
FIG. 5 is a schematic perspective view of a user interacting with the system of FIG. 1.
Figure 6:
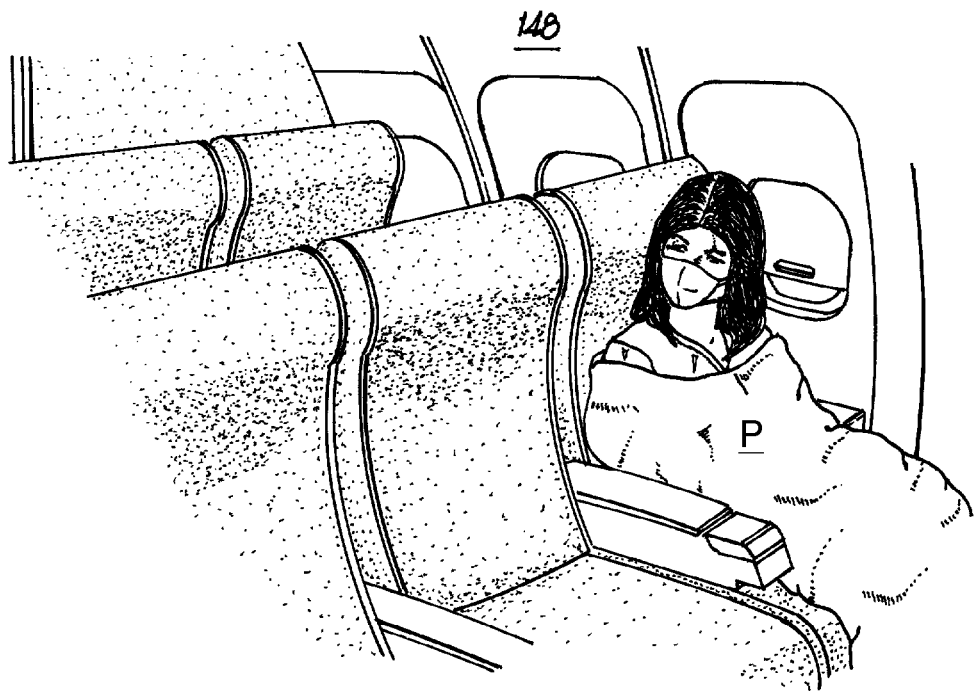
FIG. 6 is a schematic perspective view of the system of FIG. 1, showing a sick passenger in isolation for contagion containment.

A controller 134 is operatively connected to receive signals 136 from the plurality of sensors 128 to control the software controlled valves 126 via signals 138. The controller 134 includes machine readable instructions configured to cause the controller 134 to adjust the flow of air 106 through the plurality of ducts 104 with a respective valve or subset of the valves 126 based on the sensed passenger condition. For example, the controller 134 can receive input from the sensors 128 and redistribute the aggregate air flow 106 by dynamically equalizing a positive pressure midpoint (PPM) 140, 142, 144 between all nearest passenger units 124 during normal operation, to generate negative pressure around potentially sick passengers encouraging the airflow away from the other passengers (e.g. as shown in FIG. 2). In this way, if any sensor 128 detects a sick passenger health condition (e.g. high temperature, high instance of sneezing, etc.), and after evaluating occupancy, the controller 134 can decrease airflow 106 to the passenger unit 124 holding the sick passenger (e.g. as indicated), while increasing flow 106 to the surrounding passengers. The negative pressure surrounding the sick passenger P will minimize the range with which exhaled pathogens can be spread to surrounding passengers. Those valves 126 located in ducts 104 farther away from the sick passenger P may remain unchanged by the sensed condition, or they may be adjusted by any suitable amount to maintain equalized pressure within the interior space 108.

The controller 134 can include a stack based adaptive logic parameter definition item (PDI) file to be interpreted by the controller 134 along with the machine readable instructions. Through use of adaptive logic parameter definition item (PDI) files, the airline using system 100 can autonomously change the logic and behavior of the controller 134 without requiring re-verification of the core computing software applications (e.g. without requiring a 100% regression test on the entire system 100). Instead, it is only required that a change in control logic or behavior be tested for functionality with the system 100. Such a process dramatically reduces the cost of the overall system 100 as well as time to implement the system 100 should there be a change.

In embodiments, the interior space 108 can include a main space 146 and a quarantine zone 148 where sick passengers P may be placed away from other passengers. In this case, in addition to adjusting airflow as described above, adjusting the flow of air through ducts can also include increasing flow into the main space 146 while decreasing flow into the quarantine zone 148 encouraging the quarantine airflow to flow out of the aircraft. Here, the flow of air 106 from the quarantine zone is exhausted from the interior space 108, either to atmosphere through an outflow valve 150, or passed through an air filter 152 (e.g. a high-efficiency particulate absorbing (HEPA) filter) before being recirculated to the interior space 108. If there are any pathogens in the air being exhausted 106e from the interior space 108, or quarantine zone, they will be completely filtered when the air is passed through the HEPA filter 152, or they will be expelled with the air going to atmosphere. Therefore, once the air moves through the outflow 116?, that air is no longer a risk for transmission of any pathogens therein.

In accordance with another aspect of this disclosure, a method comprises sensing a passenger condition (e.g. using sensors 128) in an interior space 108 and adjusting airflow 106 into the interior space 108 based on the sensed passenger health condition and/or occupancy. Adjusting airflow 106 can include changing an airflow circulation pattern based on the sensed passenger health condition and/or occupancy. For example, adjusting airflow includes opening and/or closing a valve 126 in a respective duct 104 to increase and/or decrease flow to a passenger unit 124 based on the sensed passenger health condition and/or occupancy. Adjusting airflow 106 can thus include decreasing airflow to a respective passenger unit 124 holding a sick passenger P, and increasing airflow to a respective passenger unit(s) 124 surrounding the respective passenger unit 124 holding the sick passenger P.

In embodiments, the method can further include at least one of imaging the interior space 108 at a first time, imaging the space at a second time, and comparing the images to determine an occupancy (e.g. using an imaging device as described above) and/or sensing a weight distribution of passengers within the interior space 108 to determine an occupancy (e.g. using sensors 128).

The interior space 108 can include a main space 146 and a quarantine zone 148, where adjusting airflow includes increasing flow into the main space 146 while decreasing flow into the quarantine zone 148, exhausting air from the quarantine zone 148 from the interior space 108. Exhausting can include at least one of exhausting air 106e to atmosphere through an outflow valve 150, and/or exhausting air 106e to a recirculation module 154 and filtering the air 106e through an air filter 152 before recirculation.

The methods and systems of the present disclosure, as described above and shown in the drawings, provide for minimizing pathogen transmission in an aircraft cabin by adaptively controlling airflow through the dynamic monitoring and analysis of passengers' status. Though the system 100 as described herein is described with respect to an aircraft cabin, the systems and methods can readily apply to any enclosed interior space having an environmental control system, or other suitable HVAC system for air circulation, such as other commercial passenger vehicles or in buildings.

While the apparatus and methods of the subject disclosure have been shown and described, those skilled in the art will readily appreciate that changes and/or modifications may be made thereto without departing from the scope of the subject disclosure.

What is claimed is:
1. A system comprising:
an environmental control system (ECS) having a plurality of ducts configured to convey a flow of air into an interior space through the plurality of ducts, wherein the interior space includes a main space for at least one passenger and a quarantine zone, separate from the main space, for at least one other passenger;
a plurality of valves disposed in the plurality of ducts to control the flow of air through a respective duct into the interior space;
a plurality of sensors disposed in the interior space configured to sense a passenger condition;
a controller operatively connected to receive signals from the plurality of sensors, the controller including machine readable instructions configured to cause the controller to:
adjust the flow of air through the plurality of ducts with a respective valve or subset of the valves based on the sensed passenger condition, wherein adjusting the flow of air through the plurality of ducts includes increasing the flow of air into the main space and decreasing the flow of air into the quarantine zone and wherein the flow of air from the quarantine zone is exhausted from the interior space.

2. The system as recited in claim 1, wherein each duct of the plurality of ducts further includes an inlet and an outflow, wherein the outflow is positioned on a floor of the interior space.

3. The system as recited in claim 1, further comprising an imaging device disposed in the interior space configured to capture a reference image and a test image, wherein the sensed passenger condition includes determining a difference in passenger occupancy between the reference image and the test image.

4. The system as recited in claim 3, wherein the imaging device is a thermal imaging device, wherein the sensed passenger condition is a passenger body temperature above a threshold.

5. The system as recited in claim 1, wherein the sensed passenger condition includes at least one of: weight distribution of passengers within the interior space, physical distribution of passengers within the interior space, a passenger body temperature above a threshold, a change in relative humidity in a passenger unit above a threshold, and/or a sound of coughing or sneezing.

6. The system as recited in claim 1, wherein the valve is disposed in the duct in series with a passenger gasper valve.

7. The system as recited in claim 1, wherein the valve is disposed in the duct proximate a cabin pressurization port.

8. The system as recited in claim 1, wherein the plurality of sensors includes a sensor incorporated into an in-flight entertainment (IFE) system.

9. The system as recited in claim 1, wherein adjusting the flow of air through the plurality of ducts includes changing an airflow circulation pattern based on the sensed passenger condition.

10. The system as recited in claim 1, wherein exhausted air is exhausted to atmosphere through an outflow valve, and/or wherein the exhausted air is passed through an air filter before being recirculated.

11. The system as recited in claim 1, wherein the controller includes an adaptive logic parameter definition item (PDI) file.

12. A system comprising:
means for conveying a flow of air into an interior space through a plurality of ducts, wherein the interior space includes a main space for at least one passenger and a quarantine zone, separate from the main space, for at least one other passenger;
a plurality of valves disposed in the plurality of ducts to control the flow of air through a respective duct into the interior space;
means for sensing a passenger condition; and
means for adjusting the flow of air through the plurality of ducts with a respective valve or subset of the valves based on the sensed passenger condition, wherein adjusting the flow of air through the plurality of ducts includes increasing the flow of air into the main space and decreasing the flow of air into the quarantine zone and wherein the flow of air from the quarantine zone is exhausted from the interior space.

* * * * *